(12) United States Patent
Mayorga (10) Patent No.: US 9,317,463 B2
(45) Date of Patent: Apr. 19, 2016

(54) SYSTEMS AND METHODS FOR SMART REMOTE-CONTROL DEVICES

(75) Inventor: Miguel A. Mayorga, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1781 days.

(21) Appl. No.: 12/491,868

(22) Filed: Jun. 25, 2009

(65) Prior Publication Data

US 2010/0328547 A1  Dec. 30, 2010

(51) Int. Cl.
*H04N 5/44* (2011.01)
*G06F 13/38* (2006.01)
*H04N 21/443* (2011.01)
*H04N 21/41* (2011.01)
*H04N 21/472* (2011.01)
*H04N 21/475* (2011.01)
*H04N 21/422* (2011.01)

(52) U.S. Cl.
CPC ............ *G06F 13/385* (2013.01); *H04N 5/4403* (2013.01); *H04N 21/4104* (2013.01); *H04N 21/42207* (2013.01); *H04N 21/42208* (2013.01); *H04N 21/4435* (2013.01); *H04N 21/4755* (2013.01); *H04N 21/47214* (2013.01); *H04N 21/42224* (2013.01); *H04N 21/42225* (2013.01); *H04N 2005/4407* (2013.01); *H04N 2005/4408* (2013.01); *H04N 2005/4433* (2013.01); *H04N 2005/4442* (2013.01)

(58) Field of Classification Search
CPC ................. H04N 21/42224; H04N 21/42207; H04N 21/4104; H04N 21/42225; H04N 21/4435; H04N 21/42204
USPC .................. 348/14.05, 734, E5.096; 725/38, 725/139–141, 151–153; 710/10; 340/12.3, 340/12.22–12.29, 12.53–12.55
See application file for complete search history.

(56) References Cited

U.S. PATENT DOCUMENTS

| 6,791,467 | B1 | 9/2004 | Ben-Ze'ev | |
| 7,170,422 | B2* | 1/2007 | Nelson et al. | 340/12.28 |
| 2004/0070491 | A1* | 4/2004 | Huang et al. | 340/10.5 |
| 2004/0148632 | A1 | 7/2004 | Park et al. | |

FOREIGN PATENT DOCUMENTS

EP  1 863 275 A1  12/2007

OTHER PUBLICATIONS

International Search Report, mailed Sep. 6, 2010, for PCT/US2010/039863, 4 pages.
Written Opinion, mailed Sep. 6, 2010, for PCT/US2010/039863, 6 pages.

* cited by examiner

*Primary Examiner* — Hunter B Lonsberry
*Assistant Examiner* — Patrick A Ryan
(74) *Attorney, Agent, or Firm* — Seed IP Law Group PLLC (57) ABSTRACT

Various embodiments provide a smart remote-control device. In one embodiment, a smart remote-control device includes a keypad and a display. The smart-remote-control device is configured to obtain information about other media devices, and to display that information upon the display. The smart remote-control device is further configured to establish master-slave relationships between itself and other media devices, including set-top boxes, presentation devices, and other remote-control devices. This abstract is provided to comply with rules requiring an abstract, and it is submitted with the intention that it will not be used to interpret or limit the scope or meaning of the claims.

16 Claims, 6 Drawing Sheets

SYSTEMS AND METHODS FOR SMART REMOTE-CONTROL DEVICES

TECHNICAL FIELD

The technical field relates to remote-control devices, and more particularly, to apparatus, systems and methods for a smart remote-control device having a display that is operable to display information about other media devices, such as set-top boxes.

BRIEF SUMMARY

In one embodiment, a smart remote-control device that has a display and that is configured to control a set-top box is provided. The remote-control device is configured to transmit a query to the set-top box, the query based at least in part on a received user input; receive a response from the set-top box, the response based at least in part on the transmitted query; and display information on the display, the information based on the received response and reflecting an operational state of the set-top box.

In another embodiment, a method in a remote-control device for controlling one or more media devices is provided. The method includes transmitting a command to a media device, the command based at least in part on a user input received via a keypad of the remote-control device; receiving from the media device a response to the transmitted command; and displaying information on a display of the remote-control device, the displayed information based at least in part on the received response.

In another embodiment, a computer-readable medium is provided, the computer-readable medium including contents that enable a remote-control device to control a one or more media devices, by performing a method similar to the above.

BRIEF DESCRIPTION OF THE DRAWINGS

The components in the drawings are not necessarily to scale relative to each other. Like reference numerals designate corresponding parts throughout the several views.

DETAILED DESCRIPTION

A. Environment Overview

Figure 1:
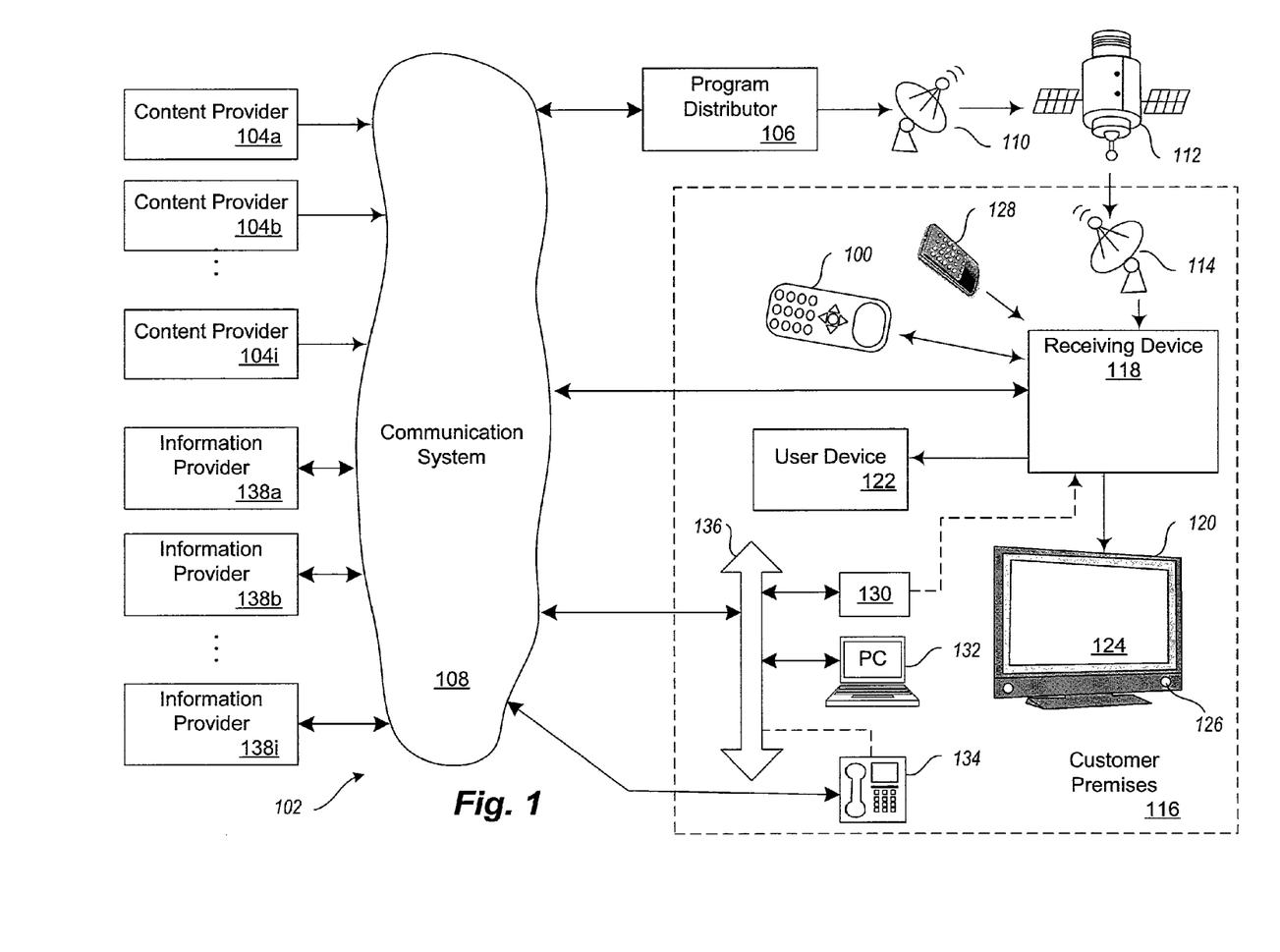
FIG. 1 is a block diagram illustrating an example communication system in which embodiments of a smart remote-control device may be implemented.

FIG. 1 is an overview block diagram illustrating an example communication system 102 in which embodiments of a smart remote-control device ("smart remote") 100 may be implemented. It is to be appreciated that FIG. 1 illustrates just one example of a communications system 102 and that the various embodiments discussed herein are not limited to such systems. Communication system 102 can include a variety of communication systems and can use a variety of communication media including, but not limited to, satellite wireless media.

Audio, video, and/or data service providers, such as, but not limited to, television service providers, provide their customers a multitude of audio/video and/or data programming (hereafter, collectively and/or exclusively "programming"). Such programming is often provided by use of a receiving device 118 communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote-control device ("remote") 128 is operable to control the presentation device 120 and other user devices 122.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display 124, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A plurality of content providers 104a-104i provide program content, such as television content or audio content, to a distributor, such as the program distributor 106. Example content providers 104a-104i include television stations which provide local or national television programming, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

In at least one embodiment, the received program content is converted by one or more devices (not shown) as necessary at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters.

The receiver antenna 114 can be located at a customer premises 116. Examples of customer premises 116 include a residence, a business, or any other suitable location operable to receive signals from satellite 112. The received signal is communicated, typically over a hard-wire connection, to a receiving device 118. The receiving device 118 is a conversion device that converts, also referred to as formatting, the received signal from antenna 114 into a signal suitable for communication to a presentation device 120 and/or a user device 122. Often, the receiver antenna 114 is of a parabolic shape that may be mounted on the side or roof of a structure. Other antenna configurations can include, but are not limited to, phased arrays, wands, or other dishes. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television ("TV") or the like, and/or to a user device 122. It is to be appreciated that presentation device 120 may be any suitable device operable to present a program having video information and/or audio information.

User device 122 may be any suitable device that is operable to receive a signal from the receiving device 118, another endpoint device, or from other devices external to the customer premises 116. Additional non-limiting examples of user device 122 include optical media recorders, such as a compact disk ("CD") recorder, a digital versatile disc or digital video disc ("DVD") recorder, a digital video recorder ("DVR"), or a personal video recorder ("PVR"). User device 122 may also include game devices, magnetic tape type recorders, RF transceivers, and personal computers ("PCs").

Interface between the receiving device 118 and a user (not shown) may be provided by a hand-held remote-control device 128. Remote 128 typically communicates with the receiving device 118 using a suitable wireless medium, such as infrared ("IR"), RF, or the like. Other devices (not shown) may also be communicatively coupled to the receiving device 118 so as to provide user instructions. Non-limiting examples include game device controllers, keyboards, pointing devices, and the like.

The receiving device 118 may receive programming partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network ("LAN") system, or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax"), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138a may provide requested information of interest to PC 132 or other computing system. Information providers 138a-138i may further perform various transactions, such as when a user purchases a product or service via their PC 132 or other computing system.

Embodiments of the smart remote-control device ("smart remote") 100 are operable to control and display information about other media devices. Examples of other media devices include the receiving device 118, the presentation device 124, the user device 122, the PC 132, the remote-control device 128, and the like.

In the illustrated example, the smart remote 100 includes a display and a keypad. The smart remote 100 is configured to transmit a command to a media device. The command is typically based at least in part on a user input received via the keypad of the smart remote 100. For example, by pressing the appropriate button on the keypad of the smart remote 100, a user may indicate that they wish to see the status the receiving device 118 and/or its associated presentation device 124. In response, the smart remote 100 transmits the appropriate command, such as a status query to the receiving device 118. Other types of commands may be sent in addition to, or instead of, a status query. For example, device control/function commands, such as program selection, audio adjustment, picture adjustment, menu selection, and the like, may also be sent.

The smart remote 100 then receives from the media device a response to the transmitted command. The received response typically includes status information reflecting the operational state or condition of the media device. The status information may include various types of information about the media device, such as whether the media device is powered on, what programming is being presented by the media device, upcoming programming accessible via the media device, a media recording schedule associated with the media device, access controls associated with the media device, and the like.

The smart remote 100 then displays information on the display of the smart remote 100. The displayed information is based at least in part on the received response. For example, if the smart remote 100 received status information from the receiving device 118, the smart remote would display that information on the display of the smart remote 100.

In some embodiments, the smart remote 100 is also configured to establish a master-slave relationship between the smart remote 100 and one or more media devices, by making the smart remote 100 operable to control the one or more media devices. For example, the smart remote 100 can be used to identify itself as a master remote with respect to one or more other remote-control devices and/or receiving devices 118. In this manner, the smart remote 100 can be used to control other media devices, display information about other media devices, enforce access controls (e.g., parental controls) with respect to other media devices, and the like.

The above description of the communication system 102 and the customer premises 116, and the various devices therein, is intended as a broad, non-limiting overview of an example environment in which various embodiments of a smart remote may be implemented. The communication system 102 and the various devices therein, may contain other devices, systems and/or media not specifically described herein.

Example embodiments described herein provide applications, tools, data structures and other support to implement a smart remote that controls one or more media devices. Other embodiments of the described techniques may be used for other purposes, including for discovery and control of remote systems generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Example Smart Remote Overview

Figure 2:
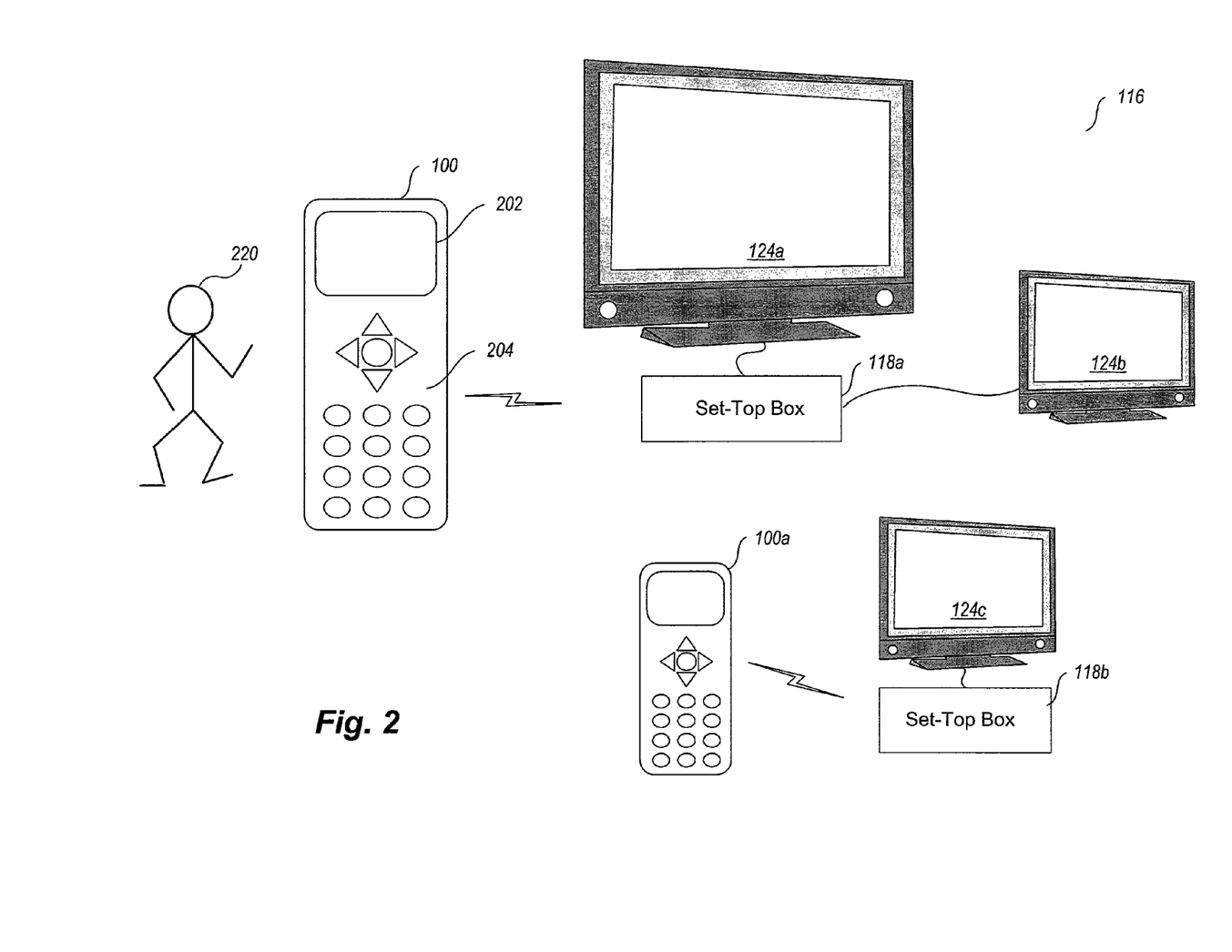
FIG. 2 is a block diagram illustrating example functional elements of an example embodiment.

FIG. 2 is a block diagram illustrating elements of an example embodiment. In particular, FIG. 2 shows an example smart remote 100 operating in customer premises 116. The customer premises 116 includes a smart remote 100, a second smart remote 100a, receiving devices 118a and 118b, and presentation devices 124a-124c. Receiving device 118a is a set-top box coupled to presentation devices 124a and 124b. Receiving device 118b is a set-top box coupled to presentation device 124c. FIG. 2 illustrates a typical example deployment of multiple receiving devices each coupled to one or more presentation devices. In the illustrated example, the receiving device 118a is located in a family room ("den") and provides output to presentation devices 124a and 124b, which are respectively located in the den and a master bedroom. Receiving device 118b is located in a children's room and provides output to presentation device 124c, which also is located in the children's room.

The smart remote 100 includes a display 202 and a keypad 204. The display 202 is a bitmapped LCD display suitable for displaying text and/or graphics. The display 202 may be suitably illuminated, such as with an LED or other type of backlight. The keypad 204 includes a combination of buttons that may be actuated by the user 220 to generate various types of inputs, including text (e.g., alphanumeric) inputs, menu selections, directional inputs (e.g., up, down, left, right), and the like. Other input/output devices are contemplated, including touch-sensitive screens, touch pads, wheel inputs, joysticks, and the like.

In the illustrated embodiment, the user 220 can utilize the smart remote 100 to obtain information about various media devices in the customer premises 116, including the receiving devices 118a and 118b, presentation devices 124a-124c, and/or the other smart remote 100a. For example, the user 220 can, by pressing the appropriate button on the keypad 204 and/or selecting an appropriate user interface control displayed on the display 202, cause the smart remote 100 to display state information associated with the receiving device 118a and/or any associated presentation device. Such state information may include, for example, the identity and type of presentation devices coupled to the receiving device 118a, the current channel/program setting(s) or selection(s) on the receiving device 118a, program guide information, recording information (e.g., list of programs previously recorded, current recording status, recording schedule), and the like. Note that this information can be obtained without powering on one of the presentation devices 124a or 124b coupled to the receiving device 118a.

The smart remote 100 obtains information from a media device in various ways. In one embodiment, the smart remote 100 "pulls" information from the media device by transmitting a query to the media device. The query identifies one or more information items from the media device, using an information exchange protocol. For example, the state of the media device may be represented as a set of key-value pairs, where the keys name or otherwise identify particular information items on the media device. In such an embodiment, a query includes one or more keys each identifying information items that reflect the state of the media device. In response to receiving the query, the media device determines the values corresponding to each of the received keys, and transmits the determined values back to the smart remote 100.

In addition, or in the alternative, the smart remote 100 may obtain information from media devices in other manners. For example, a polling mechanism may be employed. In such an approach, the smart remote 100 may request information from known media devices from time-to-time, for example, every minute.

In another embodiment, an observer-based information exchange mechanism may be employed. In such embodiments, the smart remote 100 may register with, or otherwise notify, each media device that it wishes to observe. In response, each media device automatically notifies the smart remote 100 of any events or other state changes that occur with respect to the media device. For example, when a new channel is selected by a user of smart remote 100a, the receiving device 118b notifies smart remote 100 of the new channel. In another embodiment, a discovery protocol may be implemented, in which various media devices announce or otherwise make known their existence and/or operational characteristics.

In addition, the user 220 can establish a master-slave relationship between the smart remote 100 and one or more of the various media devices in the customer premises 116. Establishing a master-slave relationship between a particular smart remote and a media device includes specifying one or more operations or functions of the media device that can be initiated via the smart remote. The specified operations may include functions related to the reception, presentation, or storage of programming, such as channel selection, volume selection, audio property adjustments, picture quality adjustments, recording functions, media sharing functions, and the like. The specified operations may further include providing operational state information, such as the current power state, current channel selection, recording status, and the like.

Master-slave relationships can be established to specify differing levels or amounts of access/control to various smart remotes within the customer premises 116. For example, the smart remote 100 may be established as a master with respect to receiving devices 118a and 118b. Further, smart remote 100a may be established as a master with respect to receiving device 118b only. In such a configuration, the user 220 (e.g., a parent) can utilize smart remote 100 to view and/or control the operation of both receiving devices 118a and 118b, whereas a user of smart remote 100 (e.g., a child) can only view or control the operation of receiving device 118b.

As another example, master-slave relationships can be specified with respect to other types of media devices, such as the presentation devices themselves. For example, smart remote 100 may be established as a master with respect to presentation devices 124a-124c, whereas smart remote 100a may be established as a master with respect to presentation device 124c only.

In order to govern the access to various functions of the smart remote 100, such as the establishment of master-slave relationships, various types of access controls may be employed. For example, one or more of the functions of the smart remote 100 may be password protected, such that the user 220 must provide a password or other identifier (e.g., a PIN, biometric identifier) to access the protected functions.

C. Example Smart Remote User Interface

Figure 3A:
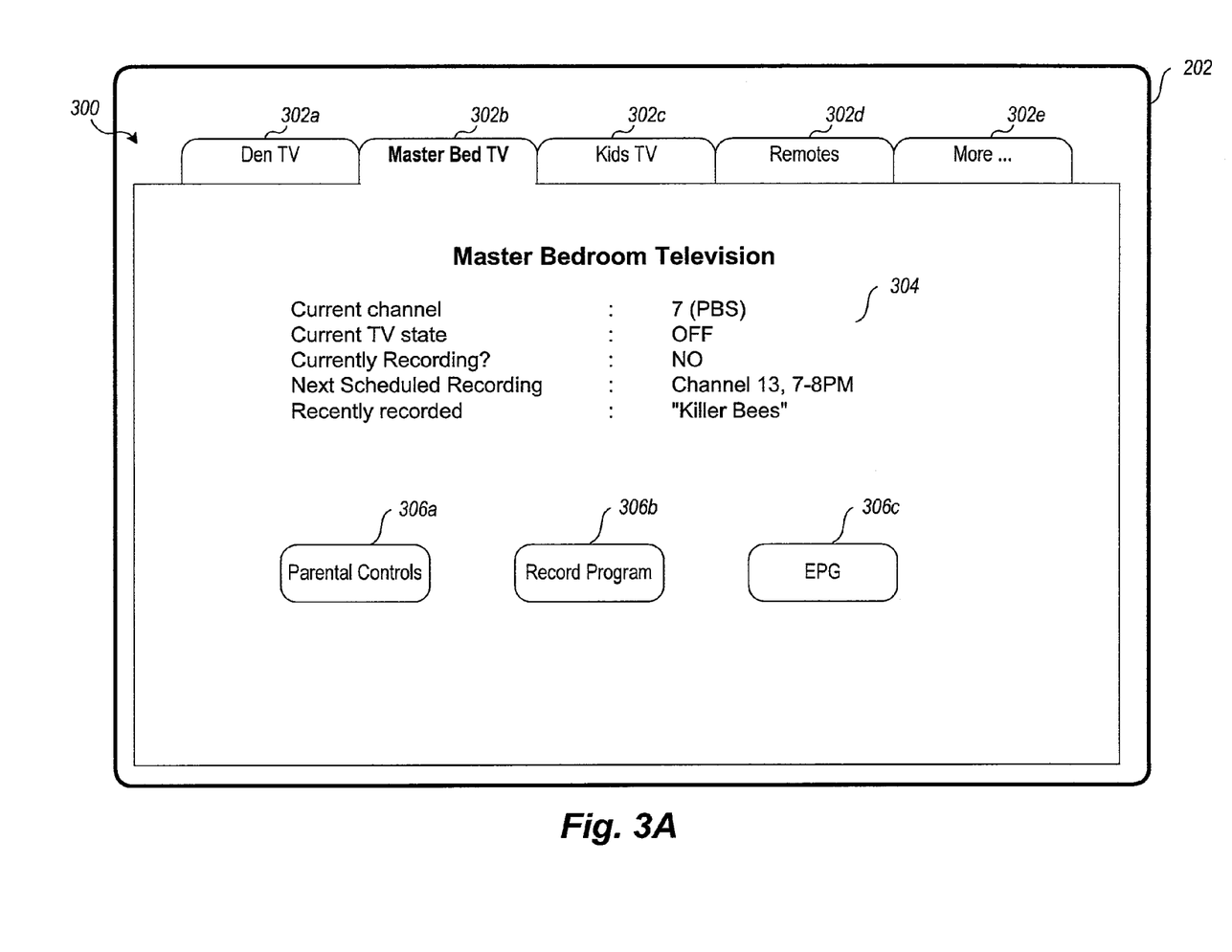
FIGS. 3A-3B are block diagrams illustrating example user interfaces provided by example embodiments.
Figure 3B:
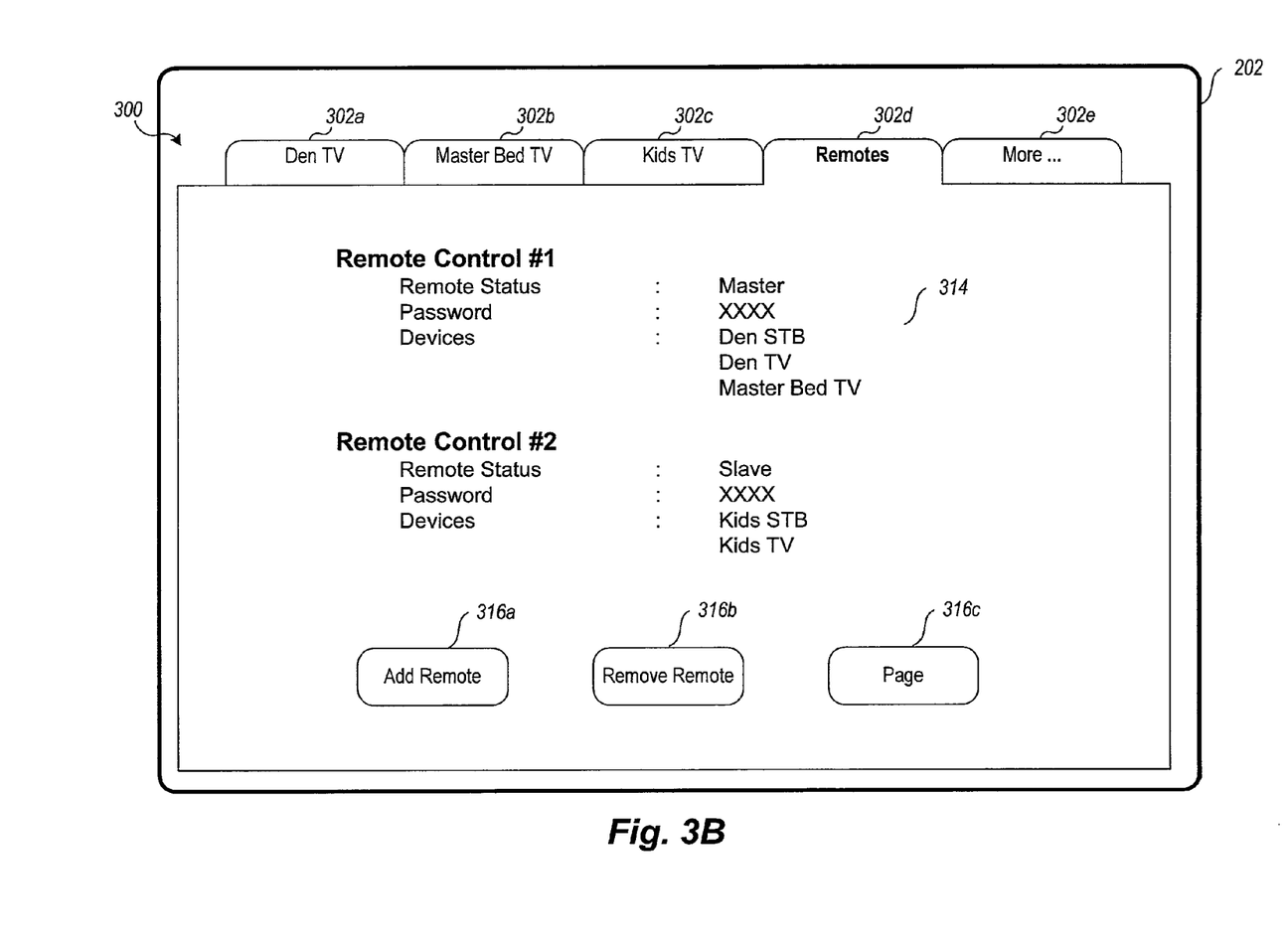

FIGS. 3A-3B are block diagrams illustrating example user interfaces provided by example embodiments. In particular, FIGS. 3A-3B show different views of a user interface 300 presented on a display 202 of a smart remote 100, such as described with reference to FIG. 2.

As shown in FIG. 3A, the user interface 300 includes multiple tabs 302a-302e. Each tab includes user interface controls (e.g., buttons, menus, text, images) for a corresponding media device and/or some other category of features provided by, or accessed with, the smart remote 100. The displayed user interface controls provide information about the state of a media device and/or provide access to functionality provided by the media device. In the illustrated example, tabs 302a-302c respectively include controls corresponding to presentation devices 124a-124c, which are televisions located in the family room ("den"), master bedroom, and children's room, respectively, as described with reference to FIG. 2. Tab 302d includes controls corresponding to the smart remote 100 and other remote-control devices, such as smart remote 100a. Tab 302e includes controls corresponding to other media devices (e.g., audio system, video recorders), home devices (e.g., lighting systems, security systems), or other controls or information, such as global controls, user preference settings, help functions, documentation, and the like.

In the example of FIG. 3A, the user 220 has selected, via keypad 204, tab 302b corresponding to the master bedroom television (presentation device 124b). In response, the smart remote 100 has displayed tab 302b, which includes state information 304 and buttons 306a-306c. State information 304 indicates that the current channel being presented to the master bedroom television is channel 7 (PBS); that the current state of the master bedroom television is off; that no programs are currently being recorded with respect to the master bedroom television; that the next scheduled recording is channel 13, between 7 and 8 PM; and that the most recently recorded program is entitled "Killer Bees."

The user can select various fields of the displayed state information 304 in order to change the state of the presentation device 124b. For example, using directional keys on the keypad 204, the user 220 can navigate to and select the current channel field, and then select a different channel as a new current channel, by providing additional inputs with the keypad 204.

The user 220 can select buttons 306a-306c to access additional features/functions of the master bedroom television. In response to a user selection of button 306a, the smart remote 100 displays user interface controls that provide access to parental controls associated with the master bedroom television. Parental controls may be used to limit the type and amount of programming viewed on a particular media device, such as by rating, time of day, subscription package (e.g., movie package, sports package), programming type (e.g., pay per view, sports, action, adult), or the like. In response to a user selection of button 306b, the smart remote 100 displays user interface controls that provide access to recording functionality associated with the master bedroom television. In response to a user selection of button 306c, the smart remote 100 displays user interface controls that provide access to the electronic program guide ("EPG") for the master bedroom television.

In the example of FIG. 3B, the user 220 has selected, via keypad 204, tab 302d corresponding to the smart remote 100 and other remote-control devices, such as smart remote 100a. In response, the smart remote 100 has displayed tab 302d, which includes state information 314 about smart remotes 100 and 100a. State information 314 indicates that Remote Control #1 (smart remote 100) is the master remote, and that it is configured to control the set-top box in the den (receiving device 118a), the television in the den (presentation device 124a), and the television in the master bedroom (presentation device 124b). State information 314 further indicates that Remote Control #2 (smart remote 100a) is a slave remote, and that it is configured to control the set-top box in the children's room (receiving device 118b) and the television in the children's room (presentation device 124c).

In the illustrated example, a master remote is capable of controlling any device controlled by one of its slave remotes. Thus, the smart remote 100 can control both the set-top box in the children's room (receiving device 118b) and the television in the children's room (presentation device 124c), because those devices are controllable by smart remote 100a, which is a slave of smart remote 100.

The user 220 can select buttons 316a-316c to access additional features/functions related to remote-control devices. For example, in response to a user selection of button 316a, the smart remote 100 displays user interface controls operable by a user to add another remote-control device as a slave device. In response to a user selection of button 316b, the smart remote 100 displays user interface controls operable by a user to remove a remote-control device as a slave device. In response to a user selection of button 316c, the smart remote 100 displays user interface controls operable by a user to page one or more other remote-control devices. With this function, the smart remote 100 may send a signal to another remote-control device, the signal directing the other remote-control device to beep or make some other audible signal, so that it can be located by the user.

The user can select various fields of the displayed state information 314 in order to change the state of one of the displayed remote-control devices. For example, using directional keys on the keypad 204, the user 220 can navigate to and select the password field of Remote Control #1, and then set a new password for that remote-control device. One or more of such actions may of course be password protected. For example, the smart remote 100 may challenge the user for a password if they attempt to change the master/slave status of a remote or if they attempt to add/remove a remote.

Note that the user interface controls displayed as part of tab 302d may be different for other smart remotes, especially those having a different master/slave status. For example, if smart remote 100a is a slave remote with respect to smart remote 100, smart remote 100a may also be configured to display a tab similar to tab 302d, except that the tab displayed on smart remote 100a may not include one or more features, such as the ability to add/remove remotes, change passwords, or the like.

D. Example Computing System Implementation

Figure 4:
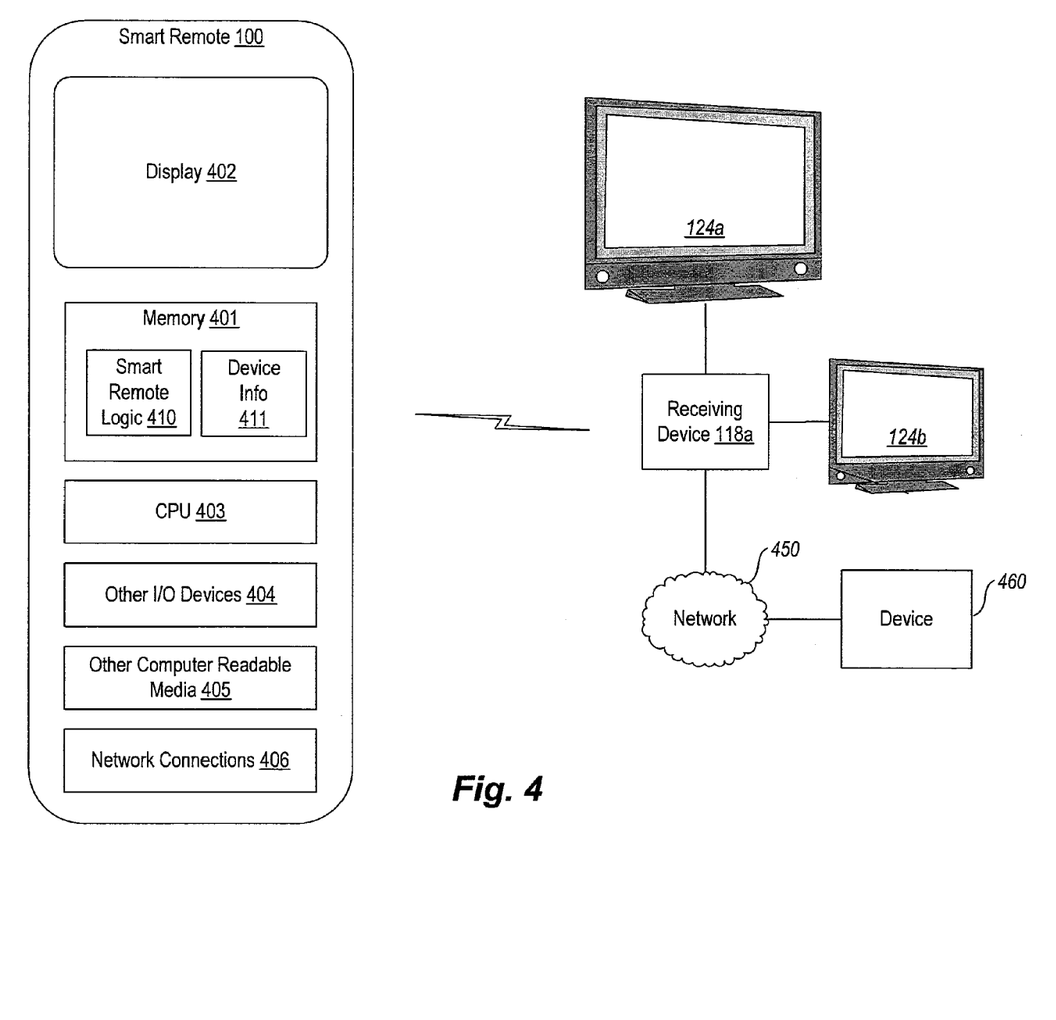
FIG. 4 is a block diagram illustrating components of an example embodiment of a smart remote-control device.

FIG. 4 is a block diagram illustrating components of an example embodiment of a smart remote-control device 100. Note that the components of the illustrated smart remote 100 may be implemented in software, hardware, firmware, or in some combination to achieve the capabilities described herein.

In the embodiment shown, smart remote 100 comprises a computer memory ("memory") 401, a display 402, one or more Central Processing Units ("CPU") 403, other Input/Output devices 404 (e.g., keyboard, wheel input, touch pad), other computer-readable media 405 (e.g., flash memory, SIM card), and network connections 406. The display 402 may be, for example a bit-mapped LCD display, such as display 202 described with reference to FIG. 2, having sufficient resolution to display multiple lines of text and/or other user interface elements. The other I/O devices 404 include the keypad 204 described with reference to FIG. 2. The network connections 406 include one or more communication interfaces to various media devices, including but not limited to radio frequency transceivers, infrared transceivers, wireless Ethernet ("Wi-Fi") interfaces, and the like.

The smart remote 100 communicates with receiving device 118, presentation device 124a, presentation device 124b, and device 460. The device 460 may be a media device or any other device amenable to control by the smart remote 100. Example media devices include other remote-control devices, video recorders, audio systems, displays, personal computers, set-top boxes, and the like. Other types of devices include control systems for home electromechanical systems, such as a lighting system, security system, climate control system, spa/pool, and the like.

Smart remote logic 410 and device information 411 is shown residing in memory 401. In other embodiments, some portion of the contents, some of, or all of the components of the logic 410 may be stored on and/or transmitted over the other computer-readable media 405. The logic 410 preferably executes on one or more CPUs 403 and manages the smart remote 100, as described herein. Other code or programs and potentially other data/information (not shown), may also reside in the memory 401, and preferably execute on one or more CPUs 403. Of note, one or more of the components in FIG. 4 may not be present in any specific implementation. For example, some embodiments may not provide other computer readable media 405.

The logic 410 performs the core functions of the smart remote 100, as discussed with respect to FIGS. 2 and 3, above. In particular, the logic 410 gathers information about various media devices, such as receiving device 118, and stores that information as device information 411. In one embodiment, the logic 410 transmits a command, such as a status query, to a media device. The logic 410 then receives a response from the queried media device, the response including the requested status information. The logic 410 then stores the received status information as device information 411.

The logic 410 also manages master-slave relationships with other media devices. A network of master-slave relationships known to the smart remote 100 is stored in device information 411. In addition, changes to various master-slave relationships are regulated by the logic 410, such as by restricting access to various functions (e.g., by password restricted access). Access control information (e.g., passwords, user identities, and the operations that may be performed by various users) used to restrict access to various functions of the smart remote 100 is also stored, in encrypted form, in device information 411.

In addition, the logic 410 performs user interface functions, such as by providing a view and a controller that facilitates user interaction with the smart remote 100 and its various components. For example, the logic 410 provides, based on device information 411, an interactive graphical user interface such as user interface 300 described with respect to FIGS. 3A-3B. As discussed, such a user interface includes controls and operational state information corresponding to various media devices accessible or controllable via the smart remote 100. The logic 410 also receives input from a user (e.g., in the form of user interface events) and translates those inputs into the appropriate command for initiation by smart remote 100.

In at least some embodiments, remote and/or programmatic access is provided to at least some of the functionality of the smart remote 100. For example, the smart remote 100 may provide to other remote-control devices an application program interface ("API") that provides access to various functions of the smart remote 100, including access to information stored by the smart remote 100 (e.g., about other media devices), the master/slave status of the smart remote 100, and the like. In this manner, the API may facilitate the development of third-party software, such as user interfaces, plug-ins, adapters (e.g., for integrating functions of the smart remote 100 into desktop applications), and the like.

In an example embodiment, the logic 410 is implemented using standard programming techniques. For example, the logic 410 may be implemented as a "native" executable running on the CPU 403, along with one or more static or dynamic libraries. In other embodiments, the logic 410 may be implemented as instructions processed by a virtual machine that executes as some other program. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the smart remote.

In addition, programming interfaces to the data stored as part of the device information 411, can be available by standard mechanisms such as through C, C++, C#, and Java APIs; libraries for accessing files, databases, or other data repositories; through scripting languages such as XML; or through Web servers, FTP servers, or other types of servers providing access to stored data. The device information 411 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an HDM.

Furthermore, in some embodiments, some or all of the components/portions of the logic 410 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

E. Processes

Figure 5:
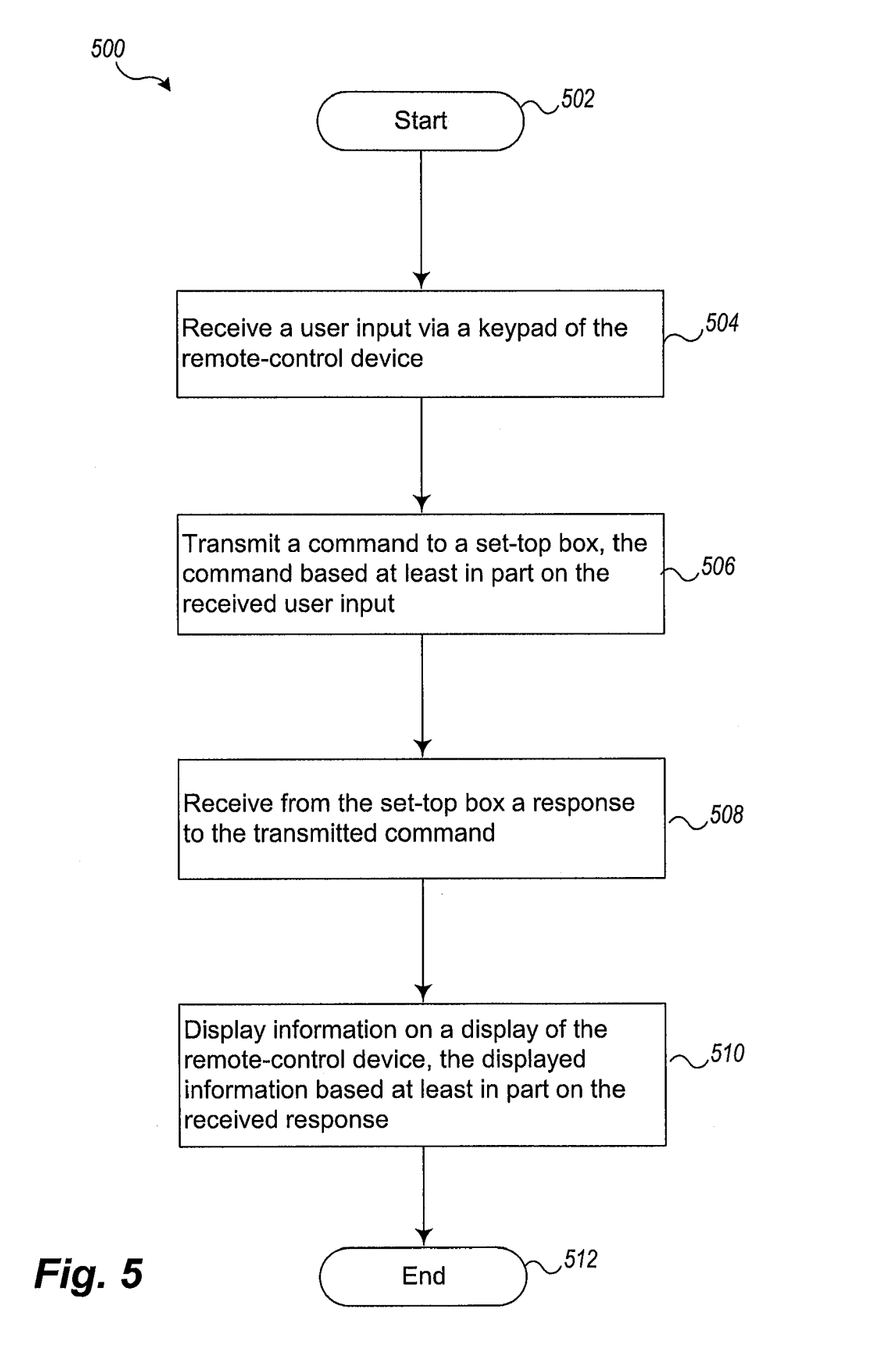
FIG. 5 is a flow diagram of an example smart remote-control process provided by an example embodiment.

FIG. 5 is a flow diagram of an example smart remote-control process provided by an example embodiment. In particular, FIG. 5 illustrates process 500 that may be implemented by, for example, the logic 410 executing on the smart remote 100, described with respect to FIGS. 2 and 4.

The illustrated process 500 starts at 502. At 504, the process receives a user input via a keypad of the remote-control device. Other types of user inputs may be received, such as inputs from a touch screen, scroll wheel, and the like.

At 506, the process transmits a command to a set-top box, the command based at least in part on the received user input. As discussed with reference to FIGS. 2-4, above, the command may be a status query used to obtain information about a remote media device, such as a set-top box. Alternatively, the command may be a command to invoke one or more functions of the media device, such as program selection, audio output adjustment, picture adjustment, or the like.

At 508, the process receives from the set-top box a response to the transmitted command. If the command was a status query, then the response includes the requested status information. If the command was to invoke a media device function (e.g., channel selection), then the response may indicate whether or not the command completed successfully, or some other status code.

At 510, the process displays information on a display of the remote-control device, the displayed information based at least in part on the received response. Examples of the displayed information are provided with respect to FIGS. 3A-3B, above. Other types of feedback are contemplated. For example, the process may use one or more lights (e.g., LEDs) on the remote-control device to indicate success or failure of the command. For instance, a green light could be used to indicate a successful command; a red light could be used to indicate command failure and/or to prompt the user to provide a new command.

At 512, the process ends. In other embodiments, the process may instead continue to one of steps 504-510, in order to process further user interaction and/or obtain additional information about other media devices.

Some embodiments perform one or more operations/aspects in addition to the ones described with respect to process 500. For example, in one embodiment, process 500 performs various operations related to processing commands received from other remote-control devices. For example, the process 500 may receive a command from another remote-control device. The received command may include a request for status information about the smart remote 100, a request to change a password for the smart remote 100, a command to change the master/slave status of the smart remote 100, or generally a request/command to access any function provided by the smart remote 100. In this manner, the smart remote 100 can be integrated into a master-slave network of other media devices, such as by becoming a slave device to another media device (e.g., another smart remote), providing information about its master-slave status with respect to other media devices, and so on.

Also, in some embodiments, the process 500 can be initiated in the absence of user input. For example, the process 500, or parts thereof, may automatically execute periodically (or upon the occurrence of other events, such as a request received from another media device) in order to obtain information about other media devices and/or to provide information about the smart remote 100.

While various embodiments have been described hereinabove, it is to be appreciated that various changes in form and detail may be made without departing from the spirit and scope of the invention(s) presently or hereafter claimed.

The invention claimed is:

1. A remote-control device configured to control a set-top box, comprising:
a display;
a memory; and
device logic that is stored on the memory and that is configured, when executed, to:
transmit a query to the set-top box, the query based at least in part on a received user input;
receive a response from the set-top box, the response based at least in part on the transmitted query;
display information on the display, the information based on the received response and reflecting an operational state of the set-top box; and
establish a master-slave relationship between the remote-control device and the set-top box, by making the remote-control device operable to be controlled by the set-top box.

2. The remote-control device of claim 1 wherein the display is a bit-mapped graphics display, and wherein the device logic is further configured, when executed, to display user interface controls that present information about the set-top box and/or facilitate control of the set-top box.

3. The remote-control device of claim 1 wherein the displayed information includes at least one of: current channel setting on the set-top box, current power state of a presentation device associated with the set-top box, current recording state of the set-top box, information about a scheduled future recording, access control information, parental control settings, and instructional information.

4. The remote-control device of claim 1 wherein the set-top box is configured to display programming on multiple presentation devices, and wherein the displayed information includes information about operational states of each of the multiple presentation devices.

5. A method in a remote-control device for controlling one or more media devices, the method comprising:
transmitting a command to a media device, the command based at least in part on a user input received via a keypad of the remote-control device;
receiving from the media device a response to the transmitted command; and
displaying information on a display of the remote-control device, the displayed information based at least in part on the received response; and
establishing a master-slave relationship between the remote-control device and the media device, by making the remote-control device operable to be controlled by the media device.

6. The method of claim 5 wherein transmitting the command includes transmitting a query for information about the media device.

7. The method of claim 5 wherein transmitting the command includes configuring access controls associated with the media device.

8. The method of claim 7 wherein the media device is a set-top box, and wherein configuring access controls associated with the media device includes at least one of setting a password for the set-top box, identifying programming that cannot be viewed via the set-top box, and disabling a function of the set-top box.

9. The method of claim 5 wherein the media device is a set-top box, and wherein displaying information on the display includes displaying information about multiple presentation devices coupled to the set-top box.

10. The method of claim 5 wherein the media device is another remote-control device.

11. The method of claim 5 wherein establishing the master-slave relationship includes identifying the remote-control device as a master remote-control device with respect to at least one of a plurality of set-top boxes, a plurality of presentation devices, and at least one other remote-control device.

12. The method of claim 5 wherein displaying information on the display includes displaying information about the established master-slave relationship.

13. A non-transitory computer-readable storage medium whose contents enable a remote-control device to control one or more media devices, by performing a method comprising:
transmitting a command to a media device, the command based at least in part on a user input received via a keypad of the remote-control device;
receiving from the media device a response to the transmitted command;
displaying information on a display of the remote-control device, the displayed information based at least in part on the received response; and
establishing a master-slave relationship between the remote-control device and the media device, by making the remote-control device operable to be controlled by the media device.

14. The non-transitory computer-readable storage medium of claim 13 wherein the computer-readable storage medium is a memory in the remote-control device, and wherein the contents are instructions that when executed cause the remote-control device to perform the method.

15. The non-transitory computer-readable storage medium of claim 13 wherein establishing the master-slave relationship includes identifying the remote-control device as a slave remote-control device with respect to another remote-control device.

16. The non-transitory computer-readable storage medium of claim 13 wherein displaying information on the display includes displaying information about the established master-slave relationship.

* * * * *